March 5, 1968  D. N. McCARTHY  3,372,053
COATING PROCESS
Filed July 22, 1963  2 Sheets-Sheet 2
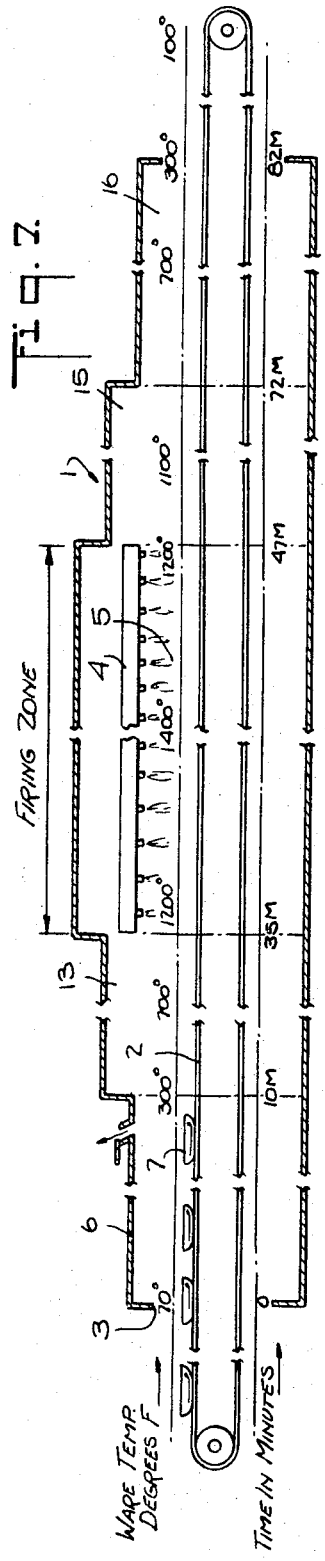
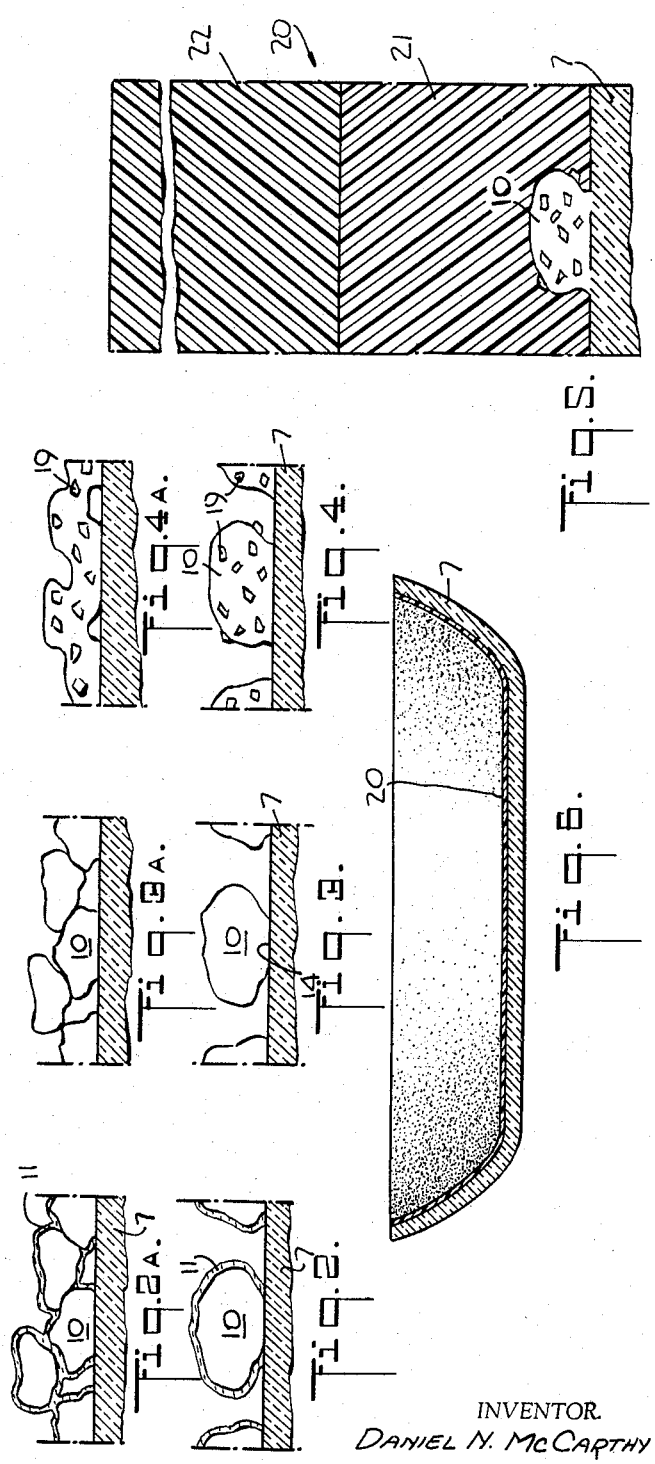
INVENTOR.
DANIEL N. McCARTHY
BY
ATTORNEY

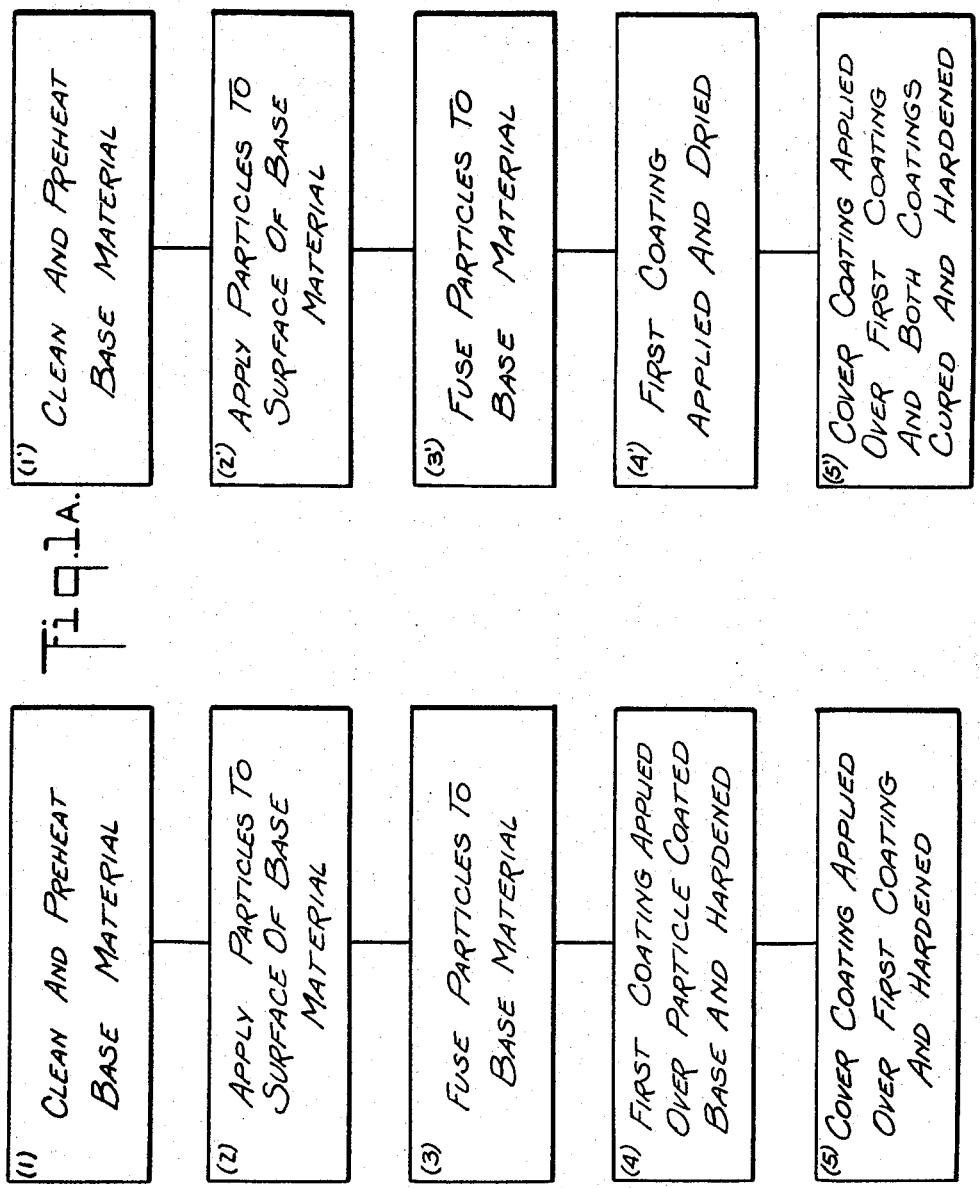

United States Patent Office 3,372,053
Patented Mar. 5, 1968

3,372,053
COATING PROCESS
Daniel N. McCarthy, Lancaster, Ohio, assignor to Anchor Hocking Glass Corporation, Lancaster, Ohio, a corporation of Delaware
Filed July 22, 1963, Ser. No. 296,625
3 Claims. (Cl. 117—70)

The present invention relates to an improved method of applying and affixing a coating to a base where the coating is hardened after being applied to the base in liquid or plastic form and more particularly relates to a method of affixing such a coating to a hard base such as a glass, ceramic, or porcelain base and to the improved coated product thus manufactured.

The method of the invention is particularly applicable for use where a plastic material is applied in liquid form to a base for attachment thereto and where there is a lack of natural adhesion or bonding between the coating and the base material so that there is a tendency for the coating to lift off or be stripped from the base during normal usage of the coated product.

One particularly advantageous application of the method relates to the coating of cooking utensils with polytetrafluoroethylene a product known in the trade under the trademark of "Teflon." The coating of cooking utensils with Teflon has already been proposed as the Teflon coating on the cooking surface of a utensil substantially eliminates the need for cooking oils or fats. It has been found that food can be cooked on the Teflon surface at the necessary temperatures without any tendency of the cooked food to stick or adhere. This provides for greaseless cooking and facilitates the cleaning of cooking utensils due to the absence of any adhered residue on the cooking surface. The application of a Teflon coating to a metal utensil, for example, is described in Patent No. 3,008,601.

It has also been proposed to utilize the advantages of such a non-stick coating on ovenware including the various forms of oven-proof glassware widely used for frying and baking. While the application of Teflon coatings to such utensils has been found to provide the above described advantages, the known methods for adhering or attaching the Teflon coating to the surface of the ware have been found to be unsatisfactory in use and difficult and expensive in manufacture and in some cases to weaken the coated article as, for example, where the article surface is sandblasted to roughen it.

Accordingly, an object of the present invention is to provide an improved method of attaching or adhering a coating to a base.

Another object of the present invention is to provide an improved method of attaching a coating to a hard base which may be performed at relatively high speeds by automatic apparatus.

Another object of the present invention is to provide an improved product comprising a plastic coating firmly attached to a hard base material.

Another object of the present invention is to provide an improved product having a Teflon coating adhered to a glass, ceramic or porcelain base.

Another object of the present invention is to provide an improved method of adhering a polytetrafluoroethylene coating to a glass surface.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a flow sheet or chart illustrating a preferred embodiment of the coating method in accordance with the invention;

FIG. 1A is a flow sheet or chart illustrating another embodiment of the method;

FIGS. 2 thru 5 are fragmentary cross sectional views, greatly enlarged, illustrating the steps in coating a glass surface with a plastic in accordance with the invention;

FIG. 6 is a cross sectional view of a cooking utensil coated in accordance with the present invention;

FIG. 7 is a diagrammatic elevational view illustrating one embodiment of a furnace or lehr for fusing the frit by the method of the present invention;

In the method of the present invention, the Teflon or other plastic coating has a significant portion of its attachment to the hard under surface provided by the physical interlock between the Teflon and a layer of spaced minute particles fused to the under surface.

As will be more fully explained below, these tiny particles are first applied and fused to the under surface and thereafter plastic such as Teflon is applied in liquid or plastic form to the particle coated surfaces so that the Teflon flows down and around the particles and is thereby physically interlocked with the under surface when the Teflon is thereafter cured to its final hardened state.

A preferred embodiment of the coating method will now be described where the heat resistant plastic coating is applied to a glass base. The description will be directed to the coating of cookware with Teflon to obtain the above described advantages of the Teflon coating in the use of the cookware.

Since the glass cookware is subjected to relatively high temperatures and may also be subject to relatively rapid temperature changes, the preferred material for the cookware is of the heat resistant type of glass having an extremely low coefficient of expansion. The coating method provides a bond which also is unaffected by such temperatures and temperature changes.

The Teflon coating is applied most advantageously as an integral step in the cookware manufacturing process. The preferred method described below permits this to be done and permits the application of the coating to cookware between its molding and its final packaging with the annealing step being done either before or after the application of the Teflon coating.

After the glass is molded into the desired shape and after the annealing step, if this is performed prior to the coating, the surface of the glass which is to be Teflon coated is cleaned of any dust or other residue by a suitable air blast or otherwise. When the coating is done immediately after the molding or annealing steps, the glass surface except for the possible presence of dust or other airborne particles is physically clean and requires no additional cleansing. Where the glass has been stored prior to the coating operation, it may have picked up an oily or other objectionable deposit and the glassware will be cleaned and washed using suitable solvents and thereafter rinsed and dried.

After the surface of the ware is clean with a dry clear surface, the ware is prepared for the coating process by being preheated so that all ware enters the coating process at a uniform and predetermined temperature thereby permitted a predetermined standard to be established and maintained for the subsequent steps and permitting the coating operation to be carried out under uniform conditions.

The article of cookware to be coated such as, for example, an oven-proof glass baking dish which is to be Teflon coated has its baking surface or the entire inner surface covered with a layer of generally uniformly spaced tiny glass particles known in the trade as frit. The frit used is a finely powered glass which will fuse when subjected to an elevated temperature and which when fused at its outer surface will weld or fuse itself to the surface of the glassware. Almost any glass frit may be used for this purpose, however, for best results the coefficient of expansion of the frit particles should be approximately equal to that of the particular glass being coated. Since the process is particularly useful for oven-proof glassware having an extremely low coefficient of expansion, the frit preferably has the same coefficient and may be conveniently formed with approximately the same ingredients as the glass melt from which the ware is molded.

This frit is preferably applied to the chosen surface of the ware using an air gun of the general type used to apply powdered materials such as abrasive powders in coats of predetermined density. The frit is preferably mixed with a liquid binder for application by the spray gun. The frit may be mixed with an oily binder, for example, a commercially obtainable binder known under the trade name "Archlor" in the amount of 50 lbs. of frit to 4 ounces of the oily binder.

Where a non-circular surface is to be sprayed, the ware is provided with a suitable mask to confine the frit to the desired surface or a special spray nozzle may be used which is capable of applying the chosen pattern.

The spraying rate and time is adjusted to provide the desired concentration of frit on the ware surface.

The frit is preferably sprayed onto the glass surface with a particle spacing wherein the individual frit particle spacing is no greater than about a particle diameter and where the spacing between particles may be decreased to a frit concentration where the frit particles partially overlap. Where the frit spacing is greater than about one particle diameter a bonding is achieved, however, it becomes less effective for greater spacings. A greater concentration of frit may be tolerated but provides no significant improvement in the bond over a partial frit particle overlap as the resulting frit surface for greater concentrations after fusing generally resembles the frit surface obtained after fusing with the preferred close frit spacing or partial overlap.

Although a uniform spacing of the frit particles on the glass surface is desirable, variations between the above described limits are not objectionable and a good bond is obtained even where such variations occur on the article surface.

After the frit has been applied to the ware, the ware is passed through a firing lehr which first removes the oily binder and which thereafter fuses the individual particles of frit so that they are fused or welded to the glass surface of the ware and to each other where they are in contact.

The lehr used in the operation may be a regular firing lehr having a conveyor on which the frit coated articles are carried through heated zones under the timing and temperature principles and guides as described below.

FIG. 7 illustrates diagrammatically a firing lehr 1 for the preferred frit drying and fusing operation. The figures above the conveyor 2 give the temperature of the frit and ware surface during the passage of the ware through the lehr 1 and the figures below the conveyor 2 give the elapsed time of passage of the ware from the lehr entrance 3 through the heating zones. These figures are for a frit particle which melts or fuses at 1200° F. Frit having higher or lower fusing points is similarly treated with temperature and time adjustments being made to obtain the preheating and partial fusing as described below.

A heater 4 is illustrated in FIG. 7 which maintains a controlled lehr temperature in the central fusing zone 5. Passage of heat in both directions through the lehr enclosure 6 provides auxiliary heating zones for the controlled initial heating and the controlled cooling of the ware 7 before and after the fusing period. In order to obtain the indicated pattern of ware temperatures the temperatures of the various zones of the lehr are adjusted by suitable vents or auxiliary heaters in the known manner. The conveyor speed is set to provide the exposure times indicated for the ware in the various portions of the lehr 1 for a frit with a fusing temperature of about 1200° F.

FIG. 2 illustrates in exaggerated form a particle of frit 10 on the surface of the ware 7 with the binder 11 providing a temporary adhesion between the frit 10 and the ware 7. This is the condition of the frit 10 as it enters the lehr 1 at a temperature between a room temperature of about 70° F. and the 100° F. preheat temperature and where the frit has been applied with some spacing between the individual particles.

During the first few minutes of travel in zone 12 the frit and ware surface are heated to about 300° F. causing moisture and much of the binder 11 to be evaporated.

The ware 7 now passes through a pre-fusing zone 13 where the frit and ware surface gradually are heated to about 700° F. causing all the binder 11 and any other organics to be removed from the frit surface leaving a clean frit particle 7 resting on the ware surface as illustrated in FIG. 3 with clean frit and ware surfaces in engagement at 14.

FIG. 4 is an exaggerated illustration of a particle of frit 10 fused or welded to the glass ware 7.

The attachment of the Teflon or other coating is also aided by the rough surface of the frit resulting from the presence of the alumina hydrate in the frit composition which forms rough particles 19 as illustrated in FIG. 4 during the fusing of the frit.

The ware now passes into the firing zone 5 and is subjected to a temperature of about 1400° F. or a few hundred degrees above the frit fusing temperature for about a 12 minute period. This raises the frit and ware surface temperature to its fusing temperature causing a melting or fusing of the frit surface and brings the surface of the ware at or near a fused state. Under these conditions a fusing or welding occurs between the frit 10 and the ware 7 and the frit is tightly attached to the ware as both the frit 10 and the ware 7 cool down as they pass through the progressively decreasing temperatures of cooling zones 15 and 16.

FIGS. 2A–4A show the corresponding steps where the frit was applied in an overlapping pattern.

After the frit particles have been applied as described above, the frit particles will attach or adhere a coating to the surface of the frit coated article.

Where it is desired, for example, to tightly adhere a plastic protective coating for low temperature use, any of the well known plastisols may be sprayed or flowed or otherwise applied over the frit in a coating of pre-determined thickness while the plastisol is liquified by a suitable plastizer. Thereafter, the plastisol coating is cured in the usual way at an elevated temperature and in its hardened state it will be tightly interlocked with the frit particles.

When a heat resistant coating is desired as for cookware, an aqueous dispersion of polytetrafluoroethylene or Teflon may be similarly applied by spraying or by other suitable applicators and the Teflon coating may be thereafter cured or hardened by subjecting the coated article to elevated temperatures in the neighborhood of 750° F. for a period of about 20 minutes. The aqueous solutions of the Teflon are mixed with varying water contents depending upon the thickness of the coating desired.

An extremely thin coating, for example, may have about one part by weight of water to nine parts by weight of Teflon. Thicker coatings may have a mixture of five parts by weight of Teflon to one part by weight of water. In both cases, the mixing and the smoothness of the coating are facilitated by using a suitable wetting agent in the mixture.

The Teflon coating may be advantageously applied in two layers using a less viscous primer coating which will more readily flow in and about the frit particles and by adding a thicker outer protective coating of a more viscous mixture capable of forming a thicker coating.

A preferred Teflon primer coat is distributed by E. I. du Pont de Nemours and Company as Teflon Prime White No. 850–302. This Teflon primer is applied by an atomizing spray to provide for precise depth control. Other means of application can be used such as dipping. The spray is adjusted to form a coating with a depth from about .2 to .4 mil. The primer coating is sprayed directly over the frit coated surface so that it flows about and interlocks with the particles of frit.

A preferred mixture for spraying the Teflon primer comprises about 95 parts of primer to 30 parts of an accelerator #VM7799 (distributed by E. I. du Pont de Nemours and Company) and 10 parts of distilled water all by weight.

After the primer coat is applied at the preferred depth it is first dried and is thereafter cured. The drying is accomplished by subjecting the coating to a relatively low temperature of about 195° F. to 200° F. for about 3 to 5 minutes. This dries out the water and other solvents so that a bubbling of the solvent and resulting blisters are avoided during the subsequent higher temperature curing operation. Any suitable oven may be used for the drying operation which provides the desired temperature and which provides for exposure of the ware to the heated atmosphere for the 3 to 5 minute interval required.

The dried primer coating is now cured by being heated in a higher temperature furnace which may be a firing lehr. This lehr has a controlled temperature of about 750° F. and the ware is subjected to this temperature for a time period of about 20 minutes to provide for a complete cure of the primer coating.

By a suitable arrangement of heating zones the drying and curing may be performed in a single pass through a lehr or furnace by having an initial 195° F. to 200° F. zone for the three minute drying and by thereafter passing the coated ware into a high temperature curing zone.

After the primer coat has been dried and cured an outer Teflon coat is applied over the primer. This coating has a preferred thickness from .6 to .8 mil to provide an overall Teflon coating of the primer and outer coating of from about .8 to 1.2 mil.

A preferred Teflon for the outer coating is Teflon Green #855–114 distributed by E. I. du Pont de Nemours and Company. This coating is applied at the desired depth by an atomizing sprayer.

A preferred mixture for spraying the Teflon outer coating comprises 100 parts of Teflon Green #855–114 to 10 parts of distilled water both by weight.

This coating is also dried as described above at a temperature of about 195° F. to 200° F. for from 3 to 5 minutes and it is thereafter cured at an elevated temperature of 750° F. for a period of 20 minutes. When the ware cools the coating process is complete.

In another embodiment of the method the ware is prepared and the frit is applied thereto in accordance with the method described above.

Thereafter the frit coated and preheated ware at a temperature of about 100° F. to 150° F. has a coating of the same Teflon primer mixture applied a depth of from .2 to .4 mil by an atomizing sprayer. This primer coat is then dried to remove water and liquid solvent at sufficiently low temperatures so that no bubbling will occur. The preferred drying is done at temeratures between 200° F. and 435° F. for periods of from 3 to 6½ minutes. The outer Teflon coat of Teflon Green #855–114 using the same mixture described above is applied over the primer coat. This again is done most conveniently by an atomizing type sprayer and the outer coat is now heated to first remove water and liquid solvent at a low temperature of about 200° F. for a 3 to 6 minute period and then the primer and the outer Teflon coating are simultaneously cured at 750° F. for 20 minutes. One curing step is thus eliminated over the above described process and the process is simplified and performed in a shorter time.

This curing is conveniently done by passing the coated ware to about 750° F. for the curing period.

FIG. 5 illustrates the cured coating 20 comprising primer coat 21 and outer coat 22.

It also has been found practical to combine the above-mentioned final drying step for the outer coat with the final curing operation for both coats. This is done by having a lower temperature portion at the entrance to the oven so that the temperature of the Teflon coating is gradually raised to about 200° F. for the first 3 minutes of travel through the furnace. The drying is accomplished in this period and the ware is then passed into the higher temperature zone so that the temperature of the primer and the outer Teflon coating are brought up to the 750° curing temperature.

It will be seen that the above described method provides an improved attachment for coatings such as Teflon coated glassware. The attachment provided is heat resistant and where a heat resistant coating such as Teflon is attached to ovenware it permits the coated article to be used at high temperatures including the full range of cooking and baking temperatures with no impairment to the bond.

The method of attachment is easily performed and is particularly well adapted to a continuous coating process where it may be made an integral part of the overall coating process.

While the method has been described in connection with a preferred embodiment relating to the coating of glassware with Teflon it is clear that the method is also applicable for the application of a plastic to other hard bases where minute particles of the base material may be themselves attached to the base by a temperature fusing process.

The method is particularly advantageous for cookware as the attaching frit may be made of the same material as the glassware itself and thus introduces no additional substances. In addition, the application of the particles or the frit builds up the thickness of the base and thus causes no weakening or possible fracture lines such as result where the under surface is prepared for coating by a scoring of grooving process. The process thus permits advantage to be taken of the full strength of an article of given thickness.

As various changes may be made in the form, construction and arrangement of the parts herein and the method steps without departing from the spirit and scope of the invention and without sacrificing any of its advantages, it is to be understood that all matter herein is to be interpreted as illustrative and not in a limiting sense.

Having thus described my invention, I claim:

1. The method of firmly attaching coatings of polytetrafluoroethylene to the interior smooth surfaces of glass cooking vessels which comprises the steps of bringing the vessels to a uniform temperature from between room temperature and about 100° F., mixing glass frit particles with a temporary tacky binder, spraying the frit particles generally uniformly over said surfaces of the vessels with the frit particle spacing being less than about one frit diameter, heating the vessels and frit for driving off the binder and fusing the surfaces only of the frit particles and bringing said surfaces of the vessels to a temperature near its fusing temperature, thereafter lowering the temperature of said vessel and frit surfaces whereby the particles are adhered to one another and form irregular and roughened layers on said surfaces of the vessels, applying a liquid dispersion of polytetrafluoroethylene of sufficient depth to form a first coating covering said layer on each of said vessels, hardening said coating, applying a more viscous liquid dispersion of polytetrafluoroethylene to form a thicker final coating on each of said vessels, and hardening said final coating.

2. The method as claimed in claim 1 which further comprises said frit particles having about the same coefficient of expansion as does said glass article.

3. The method as claimed in claim 1 which further comprises said frit particles including relatively minute particles of alumina hydrate therein.

References Cited

UNITED STATES PATENTS

| | | | |
|---|---|---|---|
| 2,264,244 | 11/1941 | Lytle | 117—124 XR |
| 2,707,703 | 5/1955 | Dorst | 117—75 X |
| 2,887,526 | 5/1959 | Rudner | 117—23 X |
| 3,211,325 | 10/1965 | Wisnicki | 117—97 |
| 2,206,686 | 7/1940 | Rauman | 117—23 |
| 2,215,227 | 6/1938 | Nash | 117—23 |
| 2,567,162 | 9/1951 | Sanders | 117—132 |
| 2,691,814 | 10/1954 | Tait | 117—132 |
| 2,944,917 | 7/1960 | Cahne | 117—70 |
| 2,974,060 | 3/1961 | Dettling | 117—21 |
| 3,047,421 | 7/1962 | Taylor | 117—70 |
| 3,080,258 | 3/1963 | Davis | 117—161 |
| 3,140,982 | 9/1963 | Shanley | 117—70 |
| 3,183,113 | 5/1965 | Gemmer | 117—23 |

FOREIGN PATENTS 658,327  2/1963  Canada.

WILLIAM D. MARTIN, *Primary Examiner.*

P. ATTAGUILE, S. W. ROTHSTEIN,

*Assistant Examiners.*